United States Patent

[11] 3,592,064

| [72] | Inventor | Jorgen Johan Gether<br>Oslo, Norway |
|---|---|---|
| [21] | Appl. No. | 800,226 |
| [22] | Filed | Feb. 18, 1969 |
| [45] | Patented | July 13, 1971 |
| [73] | Assignee | Bryggeriindustriens<br>forskningslaboratorium and<br>Sentralinstitutt for industriell forskning<br>Forskningsveien, Oslo, Norway |

[54] METHOD FOR TRANSFERRING A SAMPLE TO BE ANALYZED INTO THE COLUMN OF A GAS CHROMATOGRAPH, AND PRECOLUMN SYSTEM FOR CARRYING OUT THE METHOD
3 Claims, 9 Drawing Figs.

| [52] | U.S. Cl. | 73/422 |
|---|---|---|
| [51] | Int. Cl. | G01n 1/28 |
| [50] | Field of Search | 73/422,<br>23.1, 421.5 |

[56] References Cited
UNITED STATES PATENTS

| 1,542,517 | 6/1925 | Partlow | 251/61.2 |
|---|---|---|---|
| 3,053,077 | 9/1962 | Tracht | 73/23.1 |
| 3,115,766 | 12/1963 | Winter | 73/23.1 |
| 3,168,823 | 2/1965 | Reinecke et al. | 73/23.1 |
| 3,205,700 | 9/1965 | Liveley et al. | 73/23.1 |
| 3,223,123 | 12/1965 | Young | 73/23.1 |
| 3,240,052 | 3/1966 | Reincke et al. | 73/23.1 |
| 3,390,702 | 5/1968 | Gilmont | 138/45 |

OTHER REFERENCES
Nawar et al. ANALYTICAL CHEMISTRY Vol 32 No. 11 Oct. 1960 copy in group 280 73-23.1 page 1534

*Primary Examiner*—S. Clement Swisher
*Attorney*—Wenderoth, Lind & Ponack

ABSTRACT: An apparatus and a method for transferring a sample to be analyzed into the column of a gas chromatograph by rapid heating of the sample to evaporate it whereby transfer is effected. It further relates to a precolumn system for carrying out the method, in particular a tube in which the sample is frozen out and then heated, a restrictor providing a pressure drop in the system, a gas-operated valve, and a selection unit comprising two discs of which one is turnable, both having channels therethrough.

JORGEN JOHAN GETHER,
INVENTOR

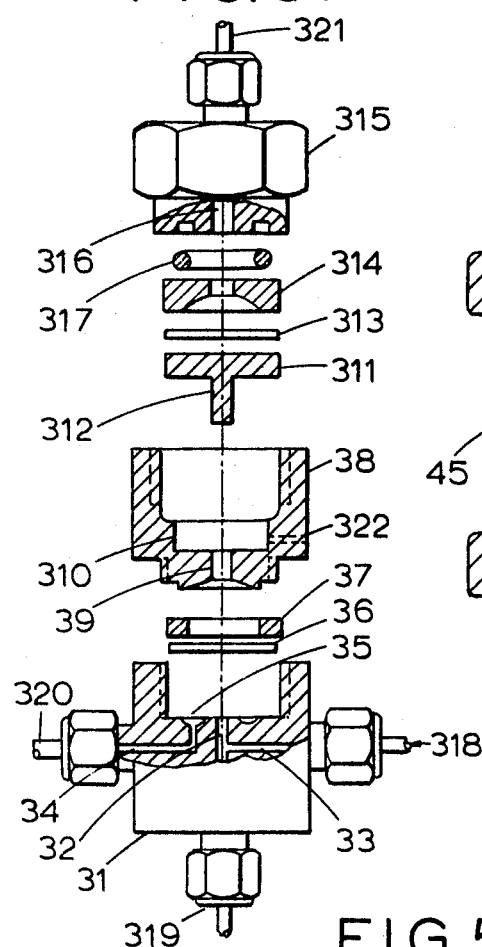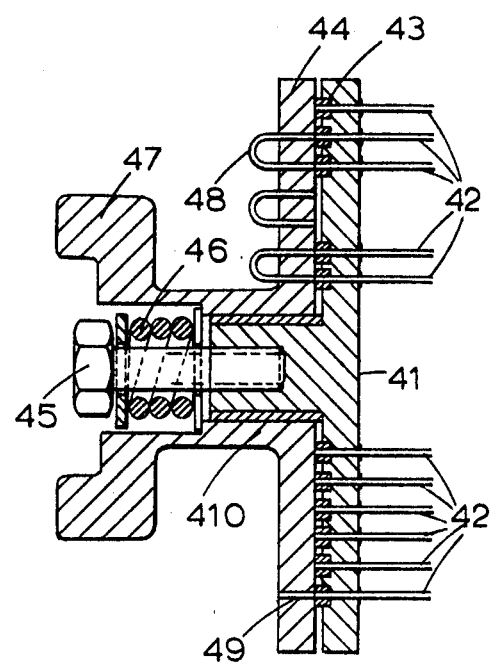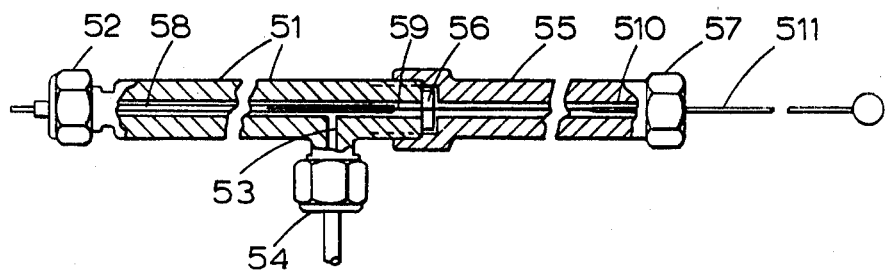

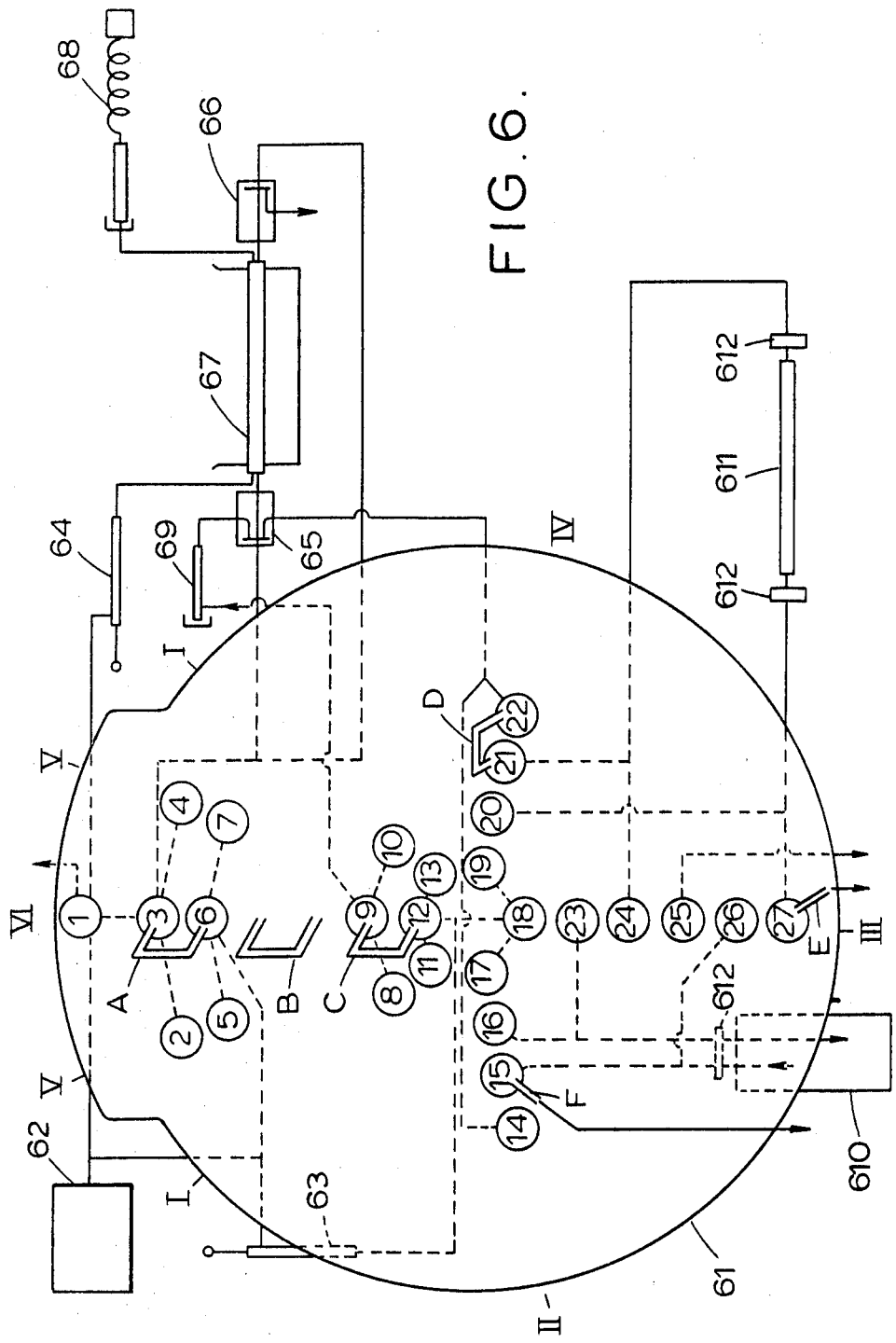

METHOD FOR TRANSFERRING A SAMPLE TO BE ANALYZED INTO THE COLUMN OF A GAS CHROMATOGRAPH, AND PRECOLUMN SYSTEM FOR CARRYING OUT THE METHOD

The invention relates to injection of a sample being solid, liquid or gaseous condition into a gas chromatograph column Briefly, the hitherto known methods for gas chromatographic analyses comprise the introduction of the sample into a precolumn including for instance collecting means or an injector, evaporation of the sample in the precolumn and transfer to the gas chromatograph column by means of an inert gas. These methods cannot be said to utilize fully the possibilities of the gas chromatograph. The term precolumn as used herein also comprises the injector in commercial gas chromatographs. With respect to the analysis of samples in liquid state by means of injector, the analysis technique can be considered as leading to relatively satisfactory results, but the technique itself is limited to direct injection of samples already present in the form of a liquid.

An object of the invention is to provide a method making it better possible to fully utilize the possibilities of the gas chromatograph, and to provide a precolumn system for analysis of substances by means of this method.

Particularly unsatisfactory results are obtained by using methods employed for the analysis of air pollution and flavor above foodstuff, the so-called head space analysis, however, on the other hand said methods are relatively rapid and simple. Recently improved methods have been provided for said purpose. Thus. E. R. Colson in Analytical Chemistry, Vol. 35, No. 8, 1963, p. 1111—1112, describes a method for trapping by adsorption of the sample in a precolumn which is thereafter sealed and brought to the gas chromatograph in which it is heated in the course of about 5 seconds by electric resistance heating for evaporation of the trapped substance. Thereafter the precolumn is connected with inert gas for introduction of the evaporated substance into the column of the gas chromatograph. Further, J. Novak, V. Vasak and J. Janak in Analytical Chemistry, Vol. 37, No. 6, 1965, describe an equilibration technique according to which such a great amount of gas is drawn through the precolumn containing adsorption material that the vapor pressure of a given component of the sample above the liquid phase in the precolumn is in equilibrium with the vapor pressure of the component in the gas to be analyzed. The precolumn is then fixed to a heating unit mounted on the gas chromatograph. After heating for desorption the sample is flushed into the gas chromatograph by means of inert gas. Further, among others M. Feldstein et al. in Journal of the Air Pollution Control Association, Vol. 15, No. 4, 1965, p. 177—178, have described trapping of a sample by freezing out in a freeze-out trap with subsequent heating and transfer to the column of the gas chromatograph by means of inert gas. Reference is also made to an article by I. Hornstein et al. in Analytical Chemistry, Vol. 34, No. 10, 1962, p. 1354—1356, describing the use of a precolumn which after the trapping is connected to the column of the gas chromatograph and heated.

Our sense organs register certain flavor components almost a hundred times more sensitively than a gas chromatograph operating according to general head space technique, and chromatograms correlating smell and taste have not been obtained. However, although the gas chromatographic methods in certain cases are less sensitive than tasting, these are on the other hand the only methods which can give an analytic expression for what may be smelled.

Thus, another object of the invention is to provide an analysis technique being particularly suitable for head space analysis and making possible satisfactory chromatograms for correlation to human smell and taste impression.

Briefly, the following four factors are those that in practice determine the sensitivity of the gas chromatograph and its ability to detect flavor components in samples:

1. Amount of sample
2. The shape of the peaks
3. The space between the peaks
4. The sensitivity of the detector.

With respect to the sensitivity of the detector a flame ionization detector will at its maximum be able to detect from $10^{116}$—to $10^{116}$-mole per second, and it is other factors that really limit the sensitivity of the gas chromatograph. On the basis of this, which seems to have been the weak point of the head space methods, the object of the invention is to improve the injection technique itself.

It is a known fact that a rapid and complete transfer of the sample into the column of the gas chromatograph is necessary to obtain a good utilization of the possibilities of the gas chromatograph. Nevertheless, as far as we know no paper has been published giving a satisfactory solution to this problem, with the exception of injection of sample in liquid form by means of a syringe into a preheated precolumn, injector, but said technique cannot be directly adapted in practice for analysis of gaseous components. One method is to trap gaseous sample in a freeze-out trap and to collect the condensate in a solvent. The mixture of solvent and components is then injected into the gas chromatograph as a liquid. The disadvantages of this method is that very large volumes containing the components to be analyzed must be passed through the freeze-out trap. The introduction into the gas chromatograph is also complicated, and the method is not suitable for rapid analyses, which is a requirement for instance by operational control. A further method comprises direct extraction of volatile components with a suitable solvent, but also in this case it is difficult to get the sample into the chromatograph. The analysis can also require very much time and is very laborious. On the other hand the analyses according to said methods give good results, but much of the quantitative connection is lost.

It is a further object of the invention to make possible the injection of gaseous samples as efficient as by the well-established direct injection technique in connection with analysis of liquid samples. The object is also to make possible a simple and rapid analysis suitable for operational control and having the same sensitivity as the above-mentioned extraction method while at the same time giving more quantitative results.

Said objects have been obtained by means of the method according to the invention which comprises transferring a sample into the column of a gas chromatograph from a precolumn into which the sample is introduced, for instance by trapping or injection, and which is characterized in that the precolumn is heated so rapidly after the introduction that transfer is effected by thermoinjection.

The term thermoinjection means such a rapid heating of a substance in a container that the substance can be transferred from said container into another one in vapor form due to the vapor pressure established through the heating. In particular thermoinjection means such a rapid heating that the evaporation of the substance can be compared with flash evaporation. An injection which is caused by the temperature change is thereby obtained, herein called thermoinjection. A more slowly heating of a precooled precolumn will presumably act as a selective valve for condensable substances.

The method of the invention can be carried out by means of a modified type of the precolumn or injector as it is usually called accompanying a gas chromatograph from the producer, but it is primarily intended to carry it out by means of a precolumn of the type used for collection of samples.

The heating time may vary somewhat, within a range of 0 to 5 seconds, depending on the volatility of the components of the sample, but it has been found that the heating time of 0.5 to 1 second is preferred in most cases when flavor components are involved. However, the main point is that a flash evaporation is obtained.

If desired, inert gas may be passed through the columns as the gas pressure established through the heating decreases in order to transfer possible remnants of particularly high boiling components of the sample from the precolumn into the column of the gas chromatograph.

The term inert gas as used herein means a noble gas or any substance which does not affect the sample and which is present as a gas under the conditions governing in the columns during the thermoinjection.

A flow of inert gas may be passed through the precolumn after the heating has taken place, as per se known. However, it has been found advantageous to pass the inert gas continuously through the columns before, during and after the heating and thereby also employ said gas as carrier gas for the column of the gas chromatograph after the heating. Thus, according to the method of the invention the inlet tubing for inert gas connected to the injector in a gas chromatograph may be rendered superfluous.

The term carrier gas as used herein means the gas which is passed continuously through the column of a gas chromatograph.

When inert gas is passed through the precolumn it may be necessary to prevent back flush in the inlet tubing for inert gas due to the great pressure rise caused by the rapid evaporation. In the inlet tubing for inert gas usually connected to the injector in a commercial gas chromatograph a back pressure valve has been built in by the producer. In order to prevent contaminations from reaching the back pressure valve a heated tube having a length of about 50 cm. will in some cases be mounted between the injector and the back pressure valve. In principle such means can also be used in the method of the present invention. However, the requirements for the prevention of back flush are much stricter with respect to thermoinjection, and said back pressure means have turned out to be inadequate. According to another feature of the method according to the invention the use of mechanical back pressure valves is avoided by passing the inert gas through such a great pressure drop that said pressure drop serves as a rapidly acting back pressure valve for the evaporated sample and the flow of inert gas. The amount of inert gas allowed to pass through the pressure drop may be adjusted according to the desired gas rate through the column of the gas chromatograph.

So-called capillary column, Open Tubular columns, having an internal diameter of 0.2 to 0.3 mm. and requiring a carrier gas rate of 1 to 2 ml./min. have a much better separating ability than ordinary columns. It is therefore of great importance that capillary columns can be used for head space analyses. When using the previously known technique this has not been possible since it takes far too much time to introduce a sufficient amount of sample. However, according to the invention this has been made possible due to the thermoinjection discussed above. It should be noted that a condition for success is that inert gas is passed through a pressure drop of the above-mentioned type.

According to the invention the method of transferring a sample into the column of a gas chromatograph can be carried out continuously and can also be automated. A preferred method for this purpose is characterized in that a first flow of inert gas is passed continuously through a pressure drop and the precolumn to the atmosphere while another flow of inert gas is passed through the precolumn to the atmosphere while the sample is the introduced into said other flow to be collected in the precolumn. Said other flow of inert gas is then closed off in front of the precolumn, the communication to the atmosphere is also closed off, and the precolumn is arranged to communicate with the column of the gas chromatograph. Finally the precolumn is heated for a period of time of less than 1 second for thermoinjection of the sample collected. The first flow of gas passing continuously through the precolumn and now also through the column of the gas chromatograph since the outlet to the atmosphere has been closed off, carries with it remnants of particularly high boiling components and serves simultaneously as carrier gas for the column of the gas chromatograph.

The other flow of inert gas may advantageously be passed through a selection unit arranged in front of the precolumn, which according to choice is connected with one of several sampling means, for instance for direct injection, for extraction of means for carrying out said equilibration technique according to Janak et al., which is thereby coupled to the precolumn. Such sampling means may for instance be included in the apparatus described in Norwegian Patent No. 115.503. A combination of extraction and thermoinjection is also possible and i.a. errors caused by condensation of flavor substances in syringes and other types of equipment used in the conventional technique are thereby obviated. By connecting the selection unit with a source of inert gas the selection unit and the sampling means as far as to the precolumn may then be flushed with inert gas during the chromatographic analysis to clean the system before the next analysis.

A further feature of the method according to the invention is that inert gas is passed through the columns by means of the heating itself. This may be obtained by condensing inert gas in front of the point in the precolumn wherein the sample is condensed, seen in the direction of the gas flow.

The method of the invention has made it possible to transfer the necessary amount of sample into the gas chromatograph in a more concentrated form and in a substantially shorter time than what is possible by the use of ordinary technique. The result of this is that:

1. Each component occupies less space in the separation column of the chromatograph.
2. It is possible to employ specific columns having a greater ability to separate the different components, such as capillary columns and ACOT columns, Support Coated Open Tubular columns.
3. Each component gives a more narrow, higher peak which is easier to detect.

By means of the precolumn system used for carrying out the method of the invention the following is obtained:

1. Injection of greater amounts of sample.
2. Rapid and accurate head space analysis from all powdery and grainy samples as well as gaseous and liquid samples.
3. Such a great accuracy and reproducible injection that so-called internal standard may be excluded.
4. The equilibration technique of Janak may be employed with optimum chromatography conditions.

The precolumn system which has made this possible comprises as per se known a precolumn including a collector means for the sample, inlet tubing for sample and inert gas, and valves for regulation of gas flow. The precolumn system is characterized in that the collector means is a thermoinjector tube which at its one end is connected with the gas chromatograph, said end also being connected with a valve capable of connecting the thermoinjector tube with the atmosphere, that the other end of the thermoinjector tube is connected with a source of inert gas and with another valve capable of connecting the thermoinjector tube with an inlet tubing for sample and inert gas, and that in front of the gas chromatograph column, seen in the direction of the gas flow, are arranged restrictors for preventing back flush of gas.

The term thermoinjector tube as used herein means a unit suitable for carrying out thermoinjection.

The thermoinjector tube which may possibly replace the injector of a gas chromatograph, is heated in principle in the same manner as certain previously known collector tubes when the trapped substance therein is to be desorbed, viz. by electric resistance heating, and the temperature rise in the thermoinjector tube is controlled as per se known with a thermocouple in an identical tube heated in the same manner. However, it appeared that the electric resistance heating involved practical difficulties due to thermal expansion of the heated parts. According to the invention these difficulties have been obviated by providing both ends of the thermoinjector tube with a sleeve being thick relative to the thermoinjector tube wall and being made of an electrically conductive material which is mechanically and electrically connected with the valves at each end. The thermoinjector tube can be kept cooled down in a per se known manner in a container containing carbon dioxide ice or liquid nitrogen, and it is not necessary to remove the colling agent during the thermoinjection. To obtain a quantitative collection of the sample the thermoinjector tube is filled with a commonly used filling material for gas chromatograph columns.

According to the invention the inlet tubing for sample and inert gas may include a selection unit for sampling according to choice. The selection unit comprises a fixed plate having channels therethrough fitted to inlet and outlet lines for gas, and against said fixed plate a turnable plate having channels therethrough. An even number of the channels in the turnable plate have been arranged in pairs so that upon turning the plate into certain positions inlet lines and outlet lines are interconnected, thereby connecting the inlet tubing of the thermoinjector tube with inert gas or with inert gas and different sampling means. It should be noted that this selection unit apparently also can replace a number of the valves so far used in the precolumn system of the invention.

According to the invention, as a substitute for available mechanical back pressure valves which react far too slowly to be suitable for thermoinjection, one or more restrictors have been arranged in the inlet tubing for inert gas in front of the column of the gas chromatograph. This restrictor constitutes a permanent or adjustable resistance against a flowing medium. The restrictor may advantageously replace the mechanical back pressure valve used in the injectors of gas chromatographs or in other places where it is of importance to prevent rapidly back flush of a flowing medium, primarily it has been contemplated for use immediately in front of the thermoinjector tube, seen in the direction of the gas flow.

That the restrictor is arranged immediately in front of the thermoinjector tube means that the volume in the inlet tubing between the restrictor and the thermoinjector tube is as small as possible. This also applies to the volume in the intermediate valve. It has been found that it is possible to reduce the sum of said volumes to less than 1 percent of the volume of the thermoinjector tube, which is of essential importance for the result. In this connection it should be mentioned that one of the thermoinjector tubes have been made with a volume of 0.7 ml., which has also been found sufficient for capillary columns. Besides, the volume depends on the gas chromatograph column used.

According to the invention the restrictor comprises a rigid wire situated in the inlet tubing for inert gas, said inlet tubing being cut off and the end thereof being surrounded by a socket having a greater internal diameter than the external diameter of the inlet tubing. The socket is in communication with the source of inert gas with which the cut off inlet tubing normally would have been connected.

The restrictor is preferably adjustable. The adjustment can be made automatically, for instance by means of a pneumatic adjusting means or by changing the temperature by means of an electric resistance coiled around the restrictor. However, in the present case it has been found that the adjustment most suitably is carried out manually by allowing the wire with an elongation thereof to protrude outside the end of the inlet tubing and the socket through a packing.

Due to the danger of condensation of the sample the whole system must be kept heated. This makes great demands on the function of the valves and the packing at the varying and partly high temperatures governing in the system. Therefore the valves are preferably special made membrane valves for operations at temperatures of up to +250° C.

According to the invention each valve comprises a valve housing having one or more inlet ducts and an outlet duct which may be connected with a number of the inlet ducts via a valve seat in the valve housing. It further comprises a first membrane situated against the valve seat, an intermediate member having axial bore against said membrane, a piston which on its one side is provided with a piston rod made to slide in the bore of the intermediate member and resting against the first membrane Further, another membrane is placed against the other side of the piston. In addition the valve comprises a top member having axial bore to connect the other membrane with a source of inert gas under pressure. The pressure from said source is used for regulation of the valve.

The intermediate member of each valve is advantageously provided with a radial bore for detection of possible gas leakage, and the volume of the outlet duct is suitably less than 1 microliter.

The precolumn system described has been built as relatively small, compact prototypes. Each unit is mounted on the gas chromatograph to constitute an integrated part of the chromatograph. It is very simple to operate.

It should be mentioned that chromatography according to the present method and by means of the precolumn system of the invention has lead to results which are superior to the results obtained with the known methods. As an example it may be mentioned that a flavor analysis of coffee using conventional technique in one case gave 27 peaks on the chromatogram, while the technique herein described gave 97 peaks.

For analyses having the sensitivity in question here contamination represents a serious problem. By means of the present method and apparatus the problem can be almost completely obviated or solved, either by thermoinjection alone or by means of the thermoinjector tube in connection with the specific restrictor, the valves and the selection unit, or, in addition to said equipment, by means of sampling means of different types. If the system should accidentally be contaminated with nonvolatile substances which are broken down over a long period of time, the system may easily be opened and flushed through, while the thermoinjector tube may be disassembled, cleaned and refilled with column material. In any case it is easy to check whether the precolumn system is free of contaminations by carrying out blank tests with pure gas.

The method and the precolumn system according to the invention are, among other things useful for:
 a. Head space analyses of stimulant and foodstuff flavor, also with respect to corrolation to organoleptic analysis.
 b. Injection into interconnected gas chromatograph-mass spectrometer.
 c. Control of micro-organisms and starting materials or products in technical, microbiological industry.
 d. Flavor passage and flavor contamination in connection with packaging.
 e. Air and water pollutions.
 f. Operational control.
 g. Specific clinical analyses.

The precolumn system of the invention and the new units included therein will in the following be described with reference to the drawings representing embodiments of the system and the units, and in which:

FIG. 3 shows a valve which may be used in the precolumn system,

FIG. 4 is a view through a preferred selection unit,

FIG. 5 shows a restrictor useful in the precolumn system,

Figure 7:
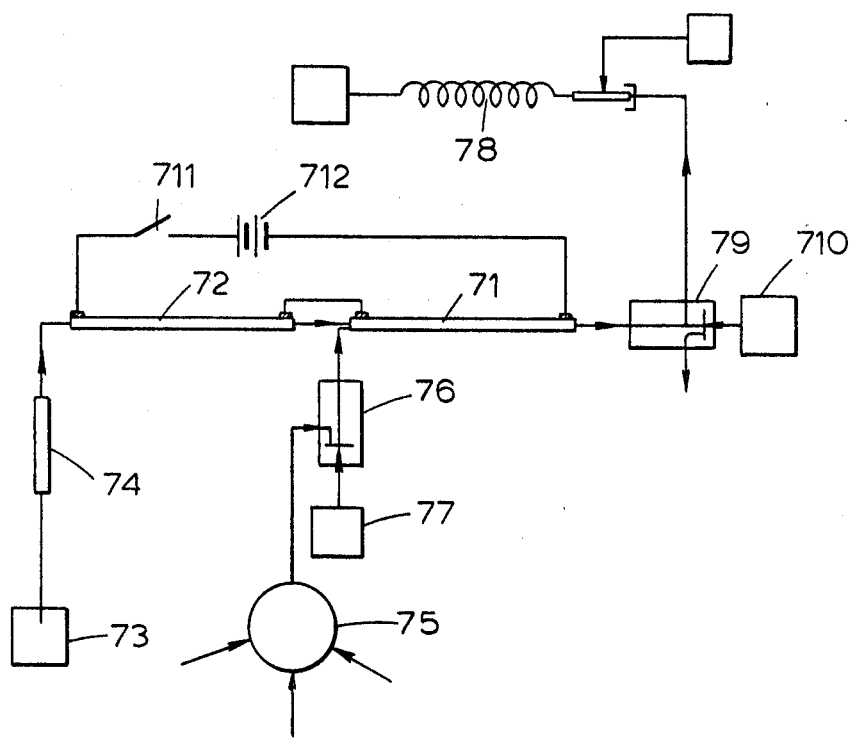
Figure 8:
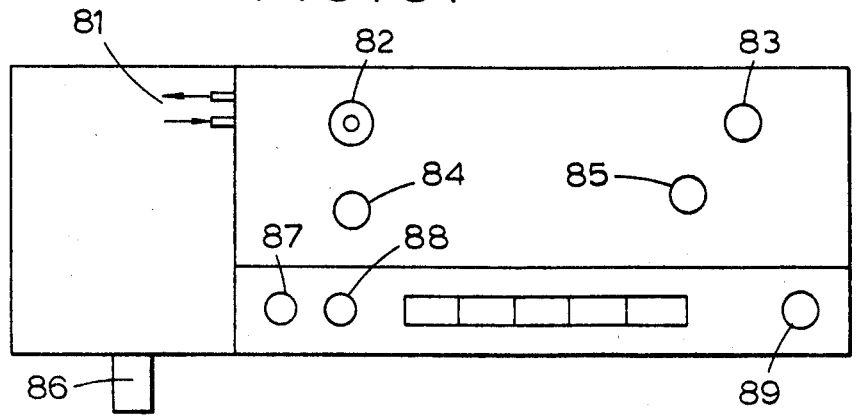
Figure 9:
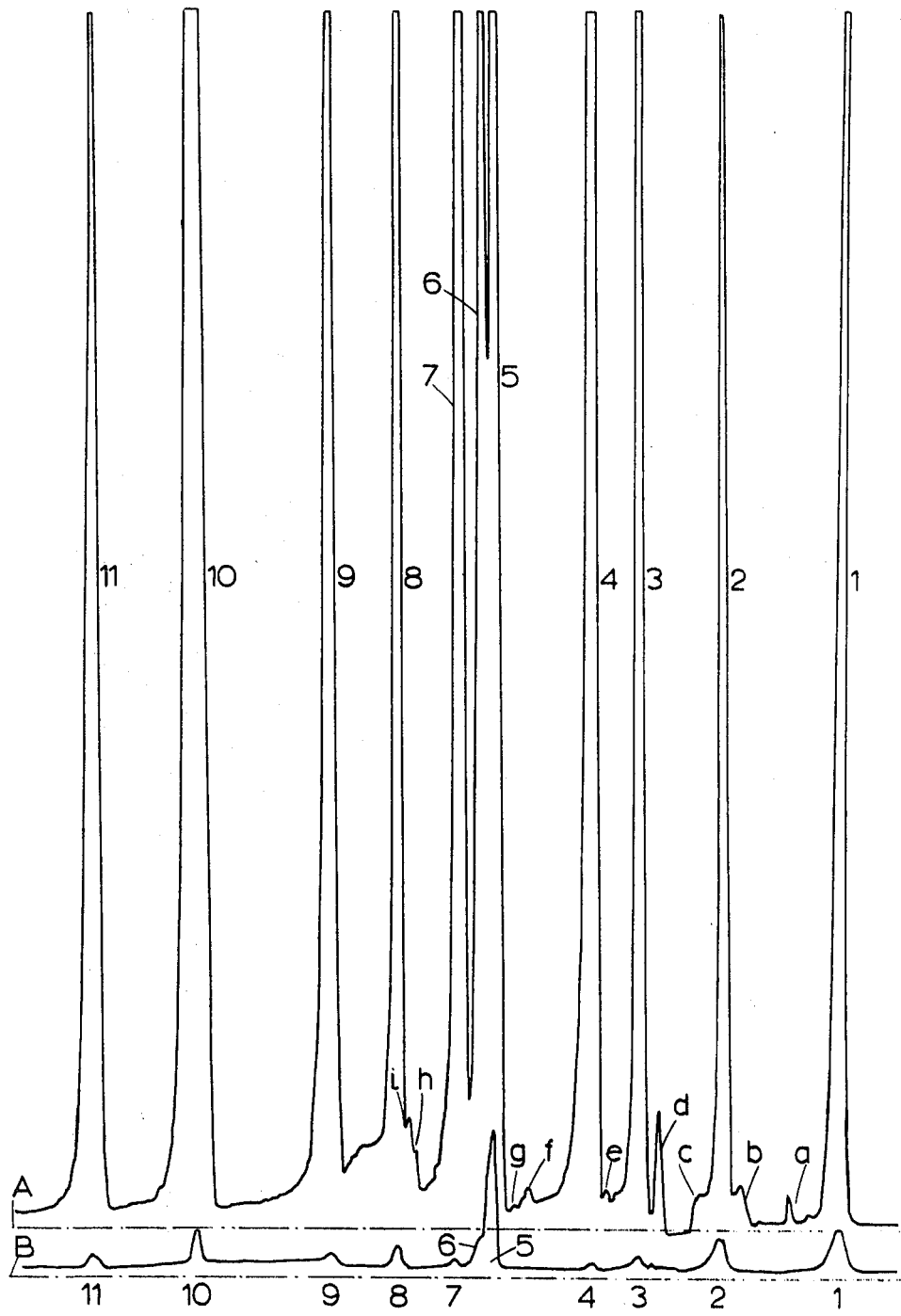

FIG. 6 illustrates the function of the selection unit of FIG. 4 in another embodiment of the precolumn system, FIG. 7 shows a principle of another embodiment of the precolumn system, FIG. 8 shows a front panel of a compact precolumn system, and FIG. 9 shows two chromatograms of which the upper one represents the technique of analysis according to the invention and the lower one known head space technique.

Figure 1:
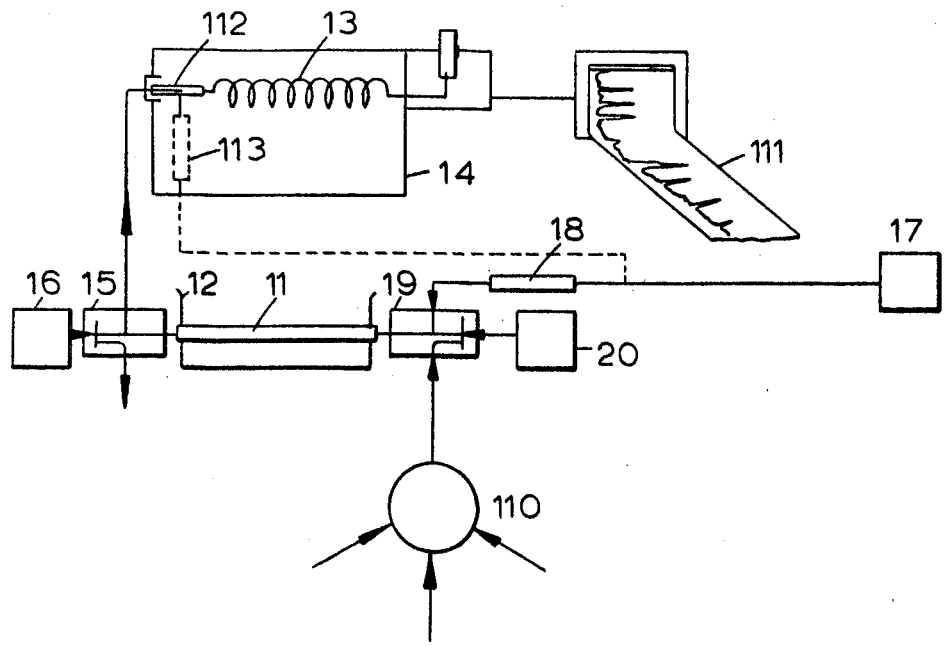
FIG. 1 shows the principle for an embodiment of the precolumn system.

In FIG. 1 11 is a thermoinjector tube as previously defined. This tube 11 will be described with reference to FIG. 2. The thermoinjector tube 11 is placed in a container 12 which may be filled with carbon dioxide ice or liquid nitrogen, and is in one end connected with a gas chromatograph columm 13 for thermoinjection of collected sample into the gas chromatograph 14. Said end of the thermoinjector tube is also connected with a membrane valve 15 capable of connecting the thermoinjector tube 11 with the atmosphere by control of the membrane valve 15 by means of inert gas from a gas source 16. In the drawing the line from the gas chromatograph goes through the membrane valve 15 but not through the closing means therein. The gas chromatograph column 13 and the membrane valve 15 may as well be connected with the injector tube 11 by means of a separate line for each as will appear from the description of the function of the system.

The other end of the thermoinjector tube 11 is connected with another source 17 of inert gas through a restrictor 18 which is described with reference to FIG. 5. Said end of the thermoinjector tube 11 is also connected with another membrane valve 19 which is regulated by means of gas from a gas source 20. It will be understood that the sources 16 and 20 may be one and the same gas source, and that the thermoinjector tube 11 may be connected with a separate line to the source 17. The membrane valve 19 is adapted to connect the thermoinjector tube 11 with an inlet tubing for inert gas and sample. If desired, inert gas only may be passed through the inlet tubing. This may be obtained by means of a selection unit 110 which may be of a known type of of the type described with reference to FIGS. 4 and 6. The membrane valves are described with reference to FIG. 3. In connection with the gas chromatograph 14 is indicated a chromatogram 111. As shown by the dotted line the gas source 17 may be connected directly to the injector of the gas chromatograph 112 through a restrictor 113 to replace the mechanical back pressure valve which is ordinarily used in the inlet tubing for carrier gas by direct injection.

When the precolumn is being used a first flow of inert gas from the gas source 17 is passed through the restrictor 18 and the thermoinjector tube 11 to the atmosphere, while another flow of inert gas is passed by means of the selection unit 110 through sampling means, not shown, to carry the sample with it, and is then passed through the membrane valve 19 and the injector tube 11 to the atmosphere for collection of the sample in the injector tube 11. The other flow of inert gas is then closed off by means of the membrane valve 19 and the gas source 20, while the communication to the atmosphere through the membrane valve 15 is also closed by means of valve 15 and the gas source 16. The thermoinjector 11 is thereby connected only with the gas chromatograph column 13, and gas from the source 17 will pass through the thermoinjector tube 11 and the column 13. The thermoinjector tube 11 is then heated for a period of time of less than 1 second to a temperature at which the sample evaporates, which in most cases will be 150—200° C., whereby thermoinjection is obtained.

Figure 2:
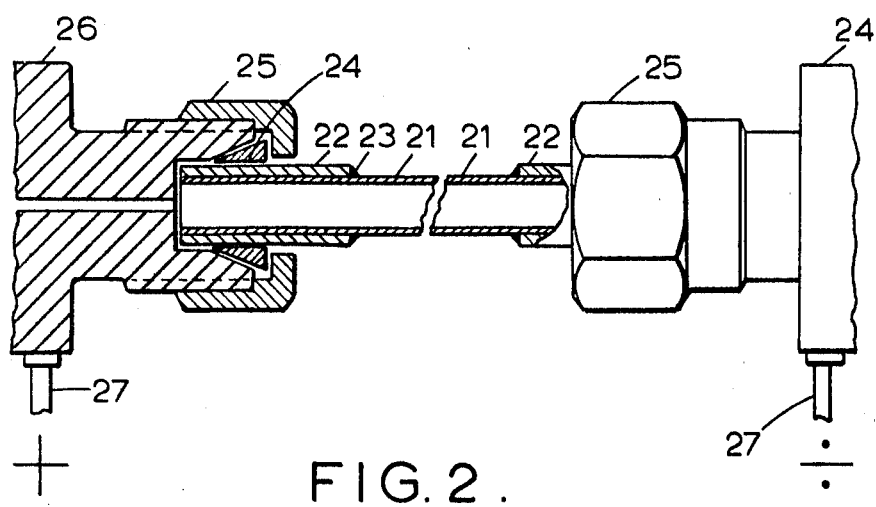
FIG. 2 shows a thermoinjector tube with coupling means.

In FIG. 2 the injector tube is illustrated in enlarged scale with reference number 21. Due to the space the middle part of the tube 21 has been excluded. The tube 21 may be filled with column material, as per se known. In both ends of the tube 21 is shown coupling means to the valves 15 and 19 in FIG. 1, here called 24 and 26. To avoid leakage problems in connection with thermoexpansion during the heating of the tube 21, each end thereof has been provided with a relatively thick sleeve of an electrically highly conductive material so that the electric resistance in the ends and thereby the heating thereof becomes small. The sleeve 22 is silver soldered or welded to the tube 21 at 23. Further, as per se known, in each end is arranged a sealing ring 24 between the sleeve 22 and the connecting member of the valve 26, while a sealing nut 25 connects each end of the tube with a connecting valve member. The tube fittings also give the necessary electric contact. The injector tube 21 is heated by electric resistance heating through couplings 27. In each end of the tube 21 is placed a plug having a hole therein or a clearance against the internal wall of the tube 21 for gas passage in order to fill out dead volume. The plug has not been shown on the drawing.

In FIG. 3 is illustrated a membrane valve of a type which may be used in the precolumn system shown on FIG. 1 and designated 15 and 19 therein. The membrane valve, which is illustrated in disassembled condition, comprises a valve housing having an axial bore 32 therethrough and a radial bore 33 in communication with the bore 32. If desired, the bore 33 may be left out or closed for certain applications. There is also a partly radial and partly axial bore 34 having its outlet at a valve seat 35 where the outlet of bore 32 also is. Above the valve seat 35 a first membrane 36 bears against the valve seat 35 by means of a first locking ring 37. An intermediate member 38 is provided with a bore 39 and a piston space 310 in which is situated a piston 311 having a piston rod 312 fixed on one side of the piston 311 and adapted to slide in the bore 39. Against the other side of the piston 311 is placed another membrane 313 by means of another locking ring 314. A top member 315 having axial bore 316 is kept in place by means of an O-ring 317. The valve is coupled to tubings 318, 319, 320 and 321. As a safety precaution a bore 322 is provided for detection of possible gas leakage.

The membrane valves have been made to withhold a temperature of about 250° C. and have an internal volume of about 1 microliter in the bores 32 and 33.

With reference to the position of the valve 19 on FIG. 1 the tubing 321 is connected with control gas, the tubing 320 with the selection unit 110 and the tubing 318 with inert gas through the restrictor 18, while tubing 319 is connected with the other end of the thermoinjector tube 11. With reference to the position of valve 15 on FIG. 1 the tubing 321 is connected with control gas, the tubing 320 with the atmosphere and the tubing 318 with the gas chromatograph 14, while the tubing 319 is connected with the other end of the injector tube 11. The control gas will act on the piston 311 which with its piston rod 312 will act on the membrane 36 and thereby close the connection between the bores 32 and 34. Without the influence of control gas the connection will be open.

FIG. 4 illustrates a selection unit which may be used in the precolumn system according to the invention and which is designated 110 on FIG. 1. However, it is stressed that the selection unit 110 in FIG. 1 may consist of any suitable means or comprise simple tubings which are connected manually with different sampling means. Since the selection unit of the invention appears to be the most advantageous it will be described in detail with reference to FIGS. 4 and 6.

In FIG. 4 is shown a fixed disc or plate 41 having a number, here 11, of channels therethrough for inlet tubings 42 having their ends connected with different sources and the other ends surrounded by packing rings 43, for instance made of teflon. Against these latter ends rests a planar surface of another disc 44 which is attached by means of a screw 45 so that it is turnable with respect to the disc 41. A screw spring 46 serves as a clamping device and the disc 44 is turned by means of a wheel 47. The turnable disc 44 is provided with a number, here 6, of channels therethrough for coupling tubes 48 which connect two and two of the channels in the disc 41. Further there is provided a single channel 49 through the disc 44, and a lining of bearing 410 between the discs 41 and 44. The mutual distance and the mutual number and the geometric arrangement of the channels in both discs 41 and 42 are such that a number of the inlet tubings 42 are connected by turning the disc 44. This will be explained below with reference to FIG. 6.

In FIG. 5 is illustrated the restrictor which in FIG. 1 is designated 18 and 113. The restrictor comprises a regulating tube or a socket 51 with coupling means 52, swagelok fitting, at its one end. Radially through the regulating tube 51 is provided a bore 53 which is connected with the source of carrier gas by means of another coupling means 54 of the same type as 52. On the other end of the regulating tube 51 is screwed a guiding member 55 with nut head 57, including a rubber packing 56. In the regulating tube 51 is situated a cannula tube 58 which at its one end is connected with the tubing coupled to the gas chromatograph, while through the other end is introduced a ground-in metal wire 59. The metal wire 59 extends with one end into the cannula tube 58 and with the other end through the rubber packing 56 and the guiding member 55 in which it in a thicker form 510 is lead through a end packing in the nut head 57 and ends in an elongation or control wire 511. In principle the cannula tube 58 actually represents the gas inlet.

Carrier gas enters through the bore 53 and passes past the wire 59 in the cannula tube 58 and out through the coupling means 52. The passage between the cannula tube 58 and the ground-in wire 59 is so narrow that an overpressure of for instance 4 kg/cm.$^2$ forces through a suitable amount of carrier gas for the column used in the gas chromatograph. Thereby is obtained the pressure drop needed to prevent back flush. The gas rate through the restrictor may be varied by pushing the ground-in wire 59 out or into the cannula tube 58. A suitable length of the restrictor is 200—250 mm.

In FIG. 6 the selection unit according to FIG. 4 has been illustrated in a large scale than the rest of the precolumn system of practical reasons and designated 61. THe previously mentioned channels and inlet tubings 42 of FIG. 4 are here designated 1—27. The turnable disc has been left out for the sake of the illustration, but coupling tubes 48 in FIG. 4 are indicated as double hoops and designated A, B and C. In addition the turnable disc has a coupling tube D, a single coupling tube E corresponding to 49 in FIG. 4, and another single coupling tube F. As will be understood the section of FIG. 4 is taken in the direction 1 to 27 in FIG. 6.

Further, the precolumn system comprises a source of inert gas 62, two restrictors 63 and 64, two membrane valves 65 and 66, a thermoinjector tube 67, a gas chromatograph injector and column 68 and three sampling locations in the form of equipment for direct injection 69, for extraction 610 and for Janak's equilibration technique 611. The part of the precolumn system situated below the selection unit 61 is shown with dotted lines. It should be noted that the tube from the restrictor 64 and the one to the column 68 instead of being directly connected to the thermoinjector tube 67 may as well go via valve 65 and 66 as illustrated in FIG. 1.

By means of the selection unit 61 the different means for sampling are connected with the thermoinjector tube here designated 67, secondary it is also coupling in the different electric functions carrying out the thermoinjection, the selection unit being provided with the necessary electric contacts. The electric equipment is of known type and will therefore not be described in this connection. The numbers I—VI show positions in question which the series of coupling tubes can be set by turning the turnable disc.

All the inlet tubings in the fixed disc which are not connected with coupling tubes in the turnable disc by the turning thereof will be closed by the turnable disc. The function of the selection unit 61 can most conveniently be explained by describing the function of the system in the different positions I—VI in which the turnable disc may be set.

Position I. Thermoinjector tube connected to direct injector,

Pure gas from the source 62 passes through the restrictor 64 to the thermoinjector tube 67 and also through the restrictor 63 to tubing 12 and from there to 11 and 13, in addition to 18, 17 and 19 from where it does not get any further. Depending upon whether the selection unit 61 is in the left or right position I, the gas will pass through the coupling C from 11 to 8 or from 13 to 10 respectively. In both positions it passes via 9 further to the direct injector 69. Here it carries with it any sample introduced and carries this through the valve 65 to the thermoinjector tube 67.

Control gas for membrane valves 65 and 66 passes via tubing 1 to the atmosphere, and tubings 6, 5 and 7 are closed. Thus, both membrane valves are open.

Position II. The thermoinjector tube coupled to the extraction unit.

Gas from the source 62 passes through the restrictor 64 to the thermoinjector tube 67 and also through the restrictor 63 to tubings 18, 17 and 19, and also to 12, 11 and 13, from where it does not get any further. From 17 the gas passes via coupling C to 16 and from there to the extraction unit 610 where it carries with it sample and continues to 15. From here it passes via coupling B to 14 and further to valve 65 and to the thermoinjector tube 67. Inlet tubings 22, 23 and 26 are closed. Control gas for the membrane valves 65 and 66 passes via inlet tubing 1 to the atmosphere, and 5, 6 and 7 are closed. Thus, both membrane valves are open.

Position III. Trapping in Janak tube.

Gas from the source 62 passes via the restrictor 64 to the thermoinjector tube 67 and also through the restrictor 63 to the inlet tubings 18, 17 and 19, and also to 12, 11 and 13, from where it does not get any further. From 18 the gas passes via the coupling C to 23 while 17 and 19 are closed. From 23 the gas passes through the extraction unit 610 where it carries with it sample to 26. From there it passes via coupling A to 27 and further to an attached Janak tube 611. From the tube 611 the gas passes to 24 and via coupling B to 25 and atmosphere. The Janak column and the extraction unit is attached to the system with a rapid coupling 612.

The control gas passes as in positions I and II. Thus, both membrane valves are open.

Position IV. Thermoinjector tube connected to Janak tube.

Gas from the source 62 passes via restrictor 64 to the thermoinjector tube 67 and also through the restrictor 63 to inlet lines 18, 17 and 19, and also to 12, 11 and 13, from where it does not get any further. From 19 the gas passes via coupling C to 20 and further to the Janak tube 611. Simultaneously with adjusting the selection unit to said position IV electric contacts, not shown, are connected with each other to heat the tube 611 to a predetermined temperature. From the Janak tube 611 the gas and the sample pass to 21 and from there via coupling B to 22 and to the valve 65. Further, it passes through the thermoinjector tube 67 and to the atmosphere the valve 66 as in positions I—III, the control gas flowing in the same manner and both valves 65, 66 being open.

Position V. Closing of the membrane valves.

Gas from the source 62 passes via the restrictor 64 to the thermoinjector tube 67 and also through the restrictor 63 to inlet tubings 12, 11 and 13, and 18, 17 and 19, without getting any further from any of these six inlet tubings. However, the gas flows to 6, 5 and 7, and further to 2 or 4 respectively by means of the coupling A depending upon whether the selection unit 61 is in the left or right position V. From 2 or 4 the gas flows to 3 and further to membrane valves 65 and 66. Thereby valves 65 and 66 are closed. Inlet tubing 1 is closed.

Position VI. Thermoinjection.

The selection unit 61 is ready for thermoinjection in position I, II or IV.

If the selection unit in advance is in one of the positions I and directly injected sample has been collected in thermoinjector tube 67, the selection unit is turned in one of the directions towards VI. When position V is passed the membrane valves 65 and 66 are closed as previously described. In this position the selection unit 61 should remain for 2—3 minutes to allow the gas to come to an equilibrium in the thermoinjector tube 67 and in the first of the gas chromatograph column 68. The selection unit is then turned to position VI, and electric switches, not shown, connect the thermoinjector tube 67 with a source of electricity to heat the thermoinjector tube to a predetermined temperature within about 0.5 second, whereby thermoinjection takes place.

Regulating gas from the source 62 will in position VI be connected with the valves 65 and 66 through inlet tubings 6 and 3 via coupling. A. In order to remove contaminations from the system while in this position gas is allowed to flow via the restrictor 63 to inlet tubing 12 and further to 9 via coupling C. From 9 the gas flows to the direct injector 69 and from there to the valve 65. Since the valve 65 is closed the gas will pass on the back of the membrane and flows out through the other inlet tubing to the tubing 22 from which the gas flows to 21 via coupling D. If the Janak tube 611 is attached, the gas will go through this in the opposite direction of what is the case in positions III and IV. Further the gas flows to tubing 27 and through E to the atmosphere. If the tube 611 is not included the gas will go to the atmosphere immediately after having passed the coupling D. The extraction flask 610 is connected with the atmosphere through tubing 15 and coupling F for balancing possible overpressure. Thus, contaminations in channels through which pure gas flows are removed while the chromatographic analyses are taking place.

If the selection unit 61 in advance is in position III, it is then adjusted to position IV.

If the selection unit 61 in advance is in positions II or IV, viz. if the extraction is to take place before the thermoinjection or if Janak's equilibration technique is to be used, respectively, the selection unit 61 is turned to position VI in one of the directions from II or IV. Sample has then not been introduced into the direct injector 69. When one of the positions I is passed some pure gas will flow into valve 65 and the thermoinjector tube 67 via the direct injector 69. The selection unit is then turned to positions V and VI as described above with respect to position VI.

In FIG. 7 71 represents a cooled down thermoinjector tube according to the invention, while 72 designates another part of the precolumn adapted to condense carrier gas from a source 73 through a restrictor 74. A selection unit 75 is arranged in front of thermoinjector tube above a membrane valve 76 which is supplied with control gas from a source 77. The thermoinjector tube 71 is connected with a gas chromatograph 78 via a membrane valve 79 which is supplied with control gas from a source 710.

After trapping the sample in the cooled down thermoinjector tube 71, and freezing out of carrier gas in the precolumn 72 the switch 711 is closed, and 71 and 72 are connected with the electricity source 712 for heating. The thermoinjection takes place as previously described, but possible remnants of the sample in the thermoinjector tube 71 is transferred in this system into the column 78 by means of the rapidly heated gas in the precolumn part 72.

In FIG. 8 is shown the front panel of a precolumn system according to the invention, which has been built and is operated without the semiautomatic selection unit according to FIGS. 4 and 6. Instead of such a selection unit use is made of two so-called mecman valves for control of the membrane valves and choice of sample from a direct injector or an extraction flask. The external measures of this unit is 400 mm. long and 100 mm. wide of deep.

The arrows 81 designate connections for gas. 82 is a hole for the direct injector, 83 is a regulation knob for a mecman valve used for control of gas flows to the membrane valves. 84 is another regulation knob for a mecman valve used as a selection valve. 85 is a switch for electricity to the thermoinjector tube. The left part of the front panel is arranged in front of, i.a., an extraction unit and is kept warm by means of a heating means designated by 86. A warning lamp 87 is included for control of the heating means 86, while a switch 88 is included in the electric circuit for the heating means 86. Another warning lamp 89 is included for control of the heating of the thermoinjector tube. The five squares represent temperature-reading scales for the extraction unit, for each of the membrane valves, for the direct injector and for the thermoinjector tube.

The unit should preferably be mounted close to a gas chromatograph to constitute and integrated part of the gas chromatograph.

FIG. 9 shows two chromatograms made to illustrate the difference of analysis sensitivity when the method and the precolumn system according to the present invention is employed, chromatogram A, and when ordinary head space analysis technique is used, chromatogram B. The chromatograms have been taken with the same gas chromatograph and with the same attenuation from a head space above a test sample containing 10 p.p.m. of each of the compounds acetone, ethanol, methylisobutylketone, n-propanol, t-butanol, isobutanol, n-butanol, secondary butanol, n-pentanol, isopentanol and t-pentanol in distilled water.

The chromatography conditions were:
Column: 7 m. ⅛-inch copper tubing having an internal diameter of 1.5 mm. and filled with 3 percent Carbowax 1540 on acid washed silanated Chromosorb W.
Carrier gas: 11.8 ml. $N_2$/min.
Temperature: Programmated 70°—130°C., 2°C./min. from injection, then constant at 130°C.
Attenuation: In the upper part of the working range of the chromatograph. The amplification can be increased 10 times as a maximum.

The peaks 1—11 on the chromatograms illustrate the much higher analysis sensitivity obtained according to the invention. Further it appears that a better separation is obtained by the technique of the invention, see the peaks 5 and 6 which have been separated in A, but not in B, in spite of the much greater amounts injected. Further, on the upper chromatogram will be seen a number of smaller peaks *a*, *b*, *c*, *d*, *e*, *f*, *g*, *h* and *i* originating from contaminations in the chemicals used, and with respect to peak *d*, from the distilled water used for dilution of the chemicals.

The peaks of chromatogram A have been cut off. At ordinary head space analyses a higher amplification is used, but with said amplification the peaks of chromatogram A would have been even further outside the paper. It would then be difficult to see that the chromatograms have been taken from the same sample.

What I claim is:

1. A method for transferring a sample into the column of a gas chromatograph from a precolumn into which the sample has already been introduced, comprising:

heating said precolumn to cause an essentially instantaneous pressure increase therein to inject the sample into the gas chromatograph column by means of the pressure established during said heating, supplying inert gas through said precolumn and gas chromatograph column to carry any remaining sample into said gas chromatograph column, as said established pressure decreases after the heating, and applying a gas flow restrictor of the capillary type as a back pressure valve for obtaining an instantaneous prevention of back flushing from said precolumn due to the pressure therein.

2. A method for transferring a sample into the column of a gas chromatograph from a precolumn, including collection of the sample in said precolumn, the combination comprising:

supplying a flow of inert gas through said precolumn towards said gas chromatograph column via a gas flow restrictor of the capillary type located upstream of precolumn in close proximity thereto, introducing a flow of inert gas and sample into said flow of inert gas between said precolumn and restrictor and venting both flows to the atmosphere between said precolumn and gas chromatograph column while said sample is trapped in said precolumn, cutting off said flow of inert gas and sample and interrupting said venting thus supplying said flow of inert gas only, through said restrictor, precolumn and gas chromatograph column, heating said precolumn for a period of time of less than 5 seconds, to a temperature that causes vaporization of said sample, applying said restrictor as a back pressure valve for obtaining instantaneous prevention of back flushing from said precolumn, and continuing the supply of said inert gas flow to carry possible remaining sample into said gas chromatograph when the pressure caused by said heating decreases and to provide carrier gas for said gas chromatograph column when chromatographing is performed.

3. A precolumn system for analyzing small amounts of volatile materials in inert gas, of air pollutions or of stimulant/foodstuff flavor, comprising:

an electrically heatable sample trapping tube equipped with such thick walls at each end portion as to allow heating of said tube in the course of less than 1 second to a temperature sufficiently high to cause evaporation of the trapped sample without causing considerable thermal dimensional changes at said end portions, a first gas flow regulation valve detachably connected to the upstream end of said tube to pass a first flow of inert gas through said tube and to pass a second flow of inert gas and sample to be trapped into said first flow, and to interrupt said second flow when said sample has been trapped, a second gas flow regulation valve detachably connected to a downstream end of said tube to pass both said flows to the atmosphere when said second flow is passed into said first flow, and to pass said first flow into a gas chromatograph column when said second flow is interrupted, valve control means for controlling said flows and, a gas flow restrictor of the capillary type located upstream of said first valve in such proximity to said tube that the gas volume between said tube and restrictor, including the volume of the gas passage in said first valve, is considerably smaller than the gas volume of said tube, said restrictor being applied as a back pressure valve for obtaining an instantaneous prevention of back flushing from said tube when heated.